United States Patent [19]

Sisson

[11] 4,150,663
[45] Apr. 24, 1979

[54] SOLAR ENERGY COLLECTOR AND CONCENTRATOR

[76] Inventor: Kenneth J. Sisson, 20 Sunken Meadow Rd., Northport, N.Y. 11768

[21] Appl. No.: 823,688

[22] Filed: Aug. 11, 1977

[51] Int. Cl.² ............................................. F24J 3/02
[52] U.S. Cl. .................................. 126/271; 350/288; 350/299
[58] Field of Search ............... 126/270, 271; 237/1 A; 350/288, 289, 292, 293, 299

[56] References Cited

U.S. PATENT DOCUMENTS

| | | | |
|---|---|---|---|
| 2,976,533 | 3/1961 | Salisbury | 126/270 |
| 3,868,823 | 3/1975 | Russell et al. | 126/270 |
| 4,034,737 | 7/1977 | Kume | 126/271 |
| 4,058,110 | 11/1977 | Holt | 126/271 |
| 4,065,053 | 12/1977 | Fletcher | 126/271 |

FOREIGN PATENT DOCUMENTS

| | | | |
|---|---|---|---|
| 252708 | 6/1964 | Australia | 126/270 |
| 635283 | 12/1927 | France | 126/271 |

Primary Examiner—James C. Yeung
Attorney, Agent, or Firm—Arnold L. Albin

[57] ABSTRACT

An apparatus for concentrating solar energy upon the surface of a collector containing a circulating heat transfer medium, whereby the radiant energy may be absorbed and utilized. The apparatus includes a housing supporting a hemispherical reflector for gathering incident solar radiation and directing the reflected energy upon an arcuate fluid-bearing tubular conduit, which is adjustable seasonally for optimizing collection of solar rays. The geometry of the combination is so arranged that the reflected energy traverses the collector in response to the angle of solar rays falling on the concentrator without need for diurnal tracking.

15 Claims, 12 Drawing Figures

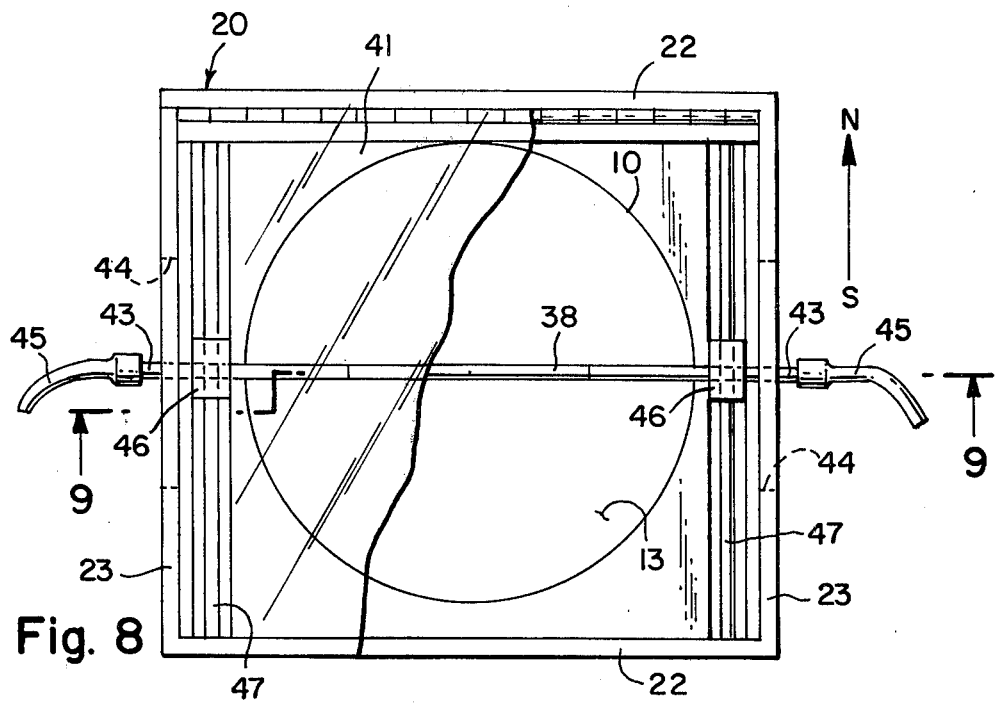
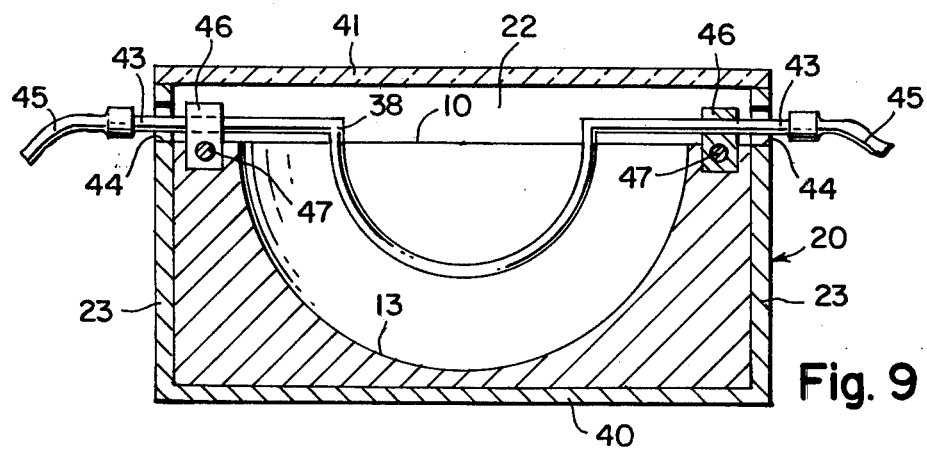
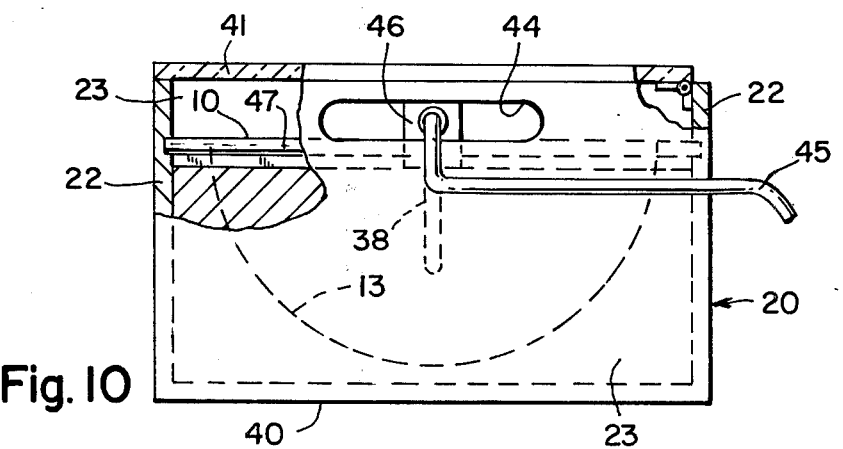

SOLAR ENERGY COLLECTOR AND CONCENTRATOR

BACKGROUND OF THE INVENTION

This invention relates to devices for the collection and utilization of electromagnetic energy, and more particularly, to a non-imaging apparatus for solar energy collection and concentration.

The worldwide energy shortage from fossil fuels has created awareness of the need for an efficient means of utilizing energy available from other sources, and particularly, solar radiant energy. Furthermore, remote areas, such as desert outposts, may provide no readily available means for conversion of fuel to heat or electricity in efficient and controllable form.

The prior art makes numerous references to attempts at efficient solar energy utilization. The literature has generally disclosed non-focusing collectors of the flat-plate type, focusing reflectors employing curved mirror or lens surfaces, and combinations of the above. More recently, non-imaging collectors with effective solar gain have been proposed.

In general, a solar energy collector requires means for collecting the incident rays of the sun, together with means for absorbing and utilizing the collected energy. There are two types of solar energy collectors around which present-day systems are designed and built. The first form is the panel-type collector, which device comprises a flat plate, adapted to receive and direct the incident radiations to an absorbing surface, which in one embodiment carries a network of light-transparent tubing, the tubing containing a liquid flowing within, from which thermal energy can be extracted and transferred to a storage system by suitable pumps and compressors. Such panels are generally oriented to an optimal position with respect to exposure to the sun for the maximum number of hours during the year. One form of the prior art of the flatplate type is shown by Alwin B. Newton in U.S. Pat. No. 2,969,788.

A major defect of panel type collectors lies in their failure to develop high enough temperatures to permit efficient utilization of the energy converted by the collectors. Thus, the temperature of the working fluid, at most, can rise only to the level of a hot asphalt pavement on a sunny day, or about 150° F. Further, where a large quantity of heat energy must be stored for future use, as to heat a residence during the night hours, a proportionately larger heat storage capacity is required, since the required quantity of heat retaining material is an inverse function of the temperature to which the material is heated.

In other prior art constructions the collection scheme employs reflective or refractive means to collect the sun's rays impinging over a relatively large area, thereafter focusing the collected energy toward a relatively small area of concentration. This approach permits obtaining very high temperatures, with a commensurate reduction in the volume of heat storage material required. However, the narrow field of acceptance of such collectors requires intricate and costly tracking apparatus to keep the sun's rays centered on the collector surface as the sun engages in its apparent diurnal motion. Such a tracking mechanism is impractical except for a research tool such as the Andorrean solar furnace, since the large mass of the moving system required where energy collection and storage is the object imposes serious practical difficulties, and sacrifices the simplicity inherent in the idea of solar energy collection.

Recent disclosures by Roland Winston, U.S. Pat. No. 4,003,638 and Riccardo Levi-Setti, U.S. Pat. No. 3,899,672, have proposed the use of so-called non-imaging light funnels of conical shape to achieve high energy concentration with minimal solar tracking. These devices have a typical concentration factor of 10, as compared with 3 or 4 for conventional non-tracking systems.

In U.S. Pat. No. 4,003,366 Daniel J. Lightfoot disclosed a solar heat system employing an elongated, triangular fluid-carrying tube, mounted within a concavo-convex reflector of hyperbolic form. However, the use of a focusing reflector without tracking means limits the energy concentration factor, as noted above.

Thus, the dichotemy between the opposing problems of solar energy concentration and solar tracking has not been resolved by the prior art. The higher cost and mechanical complexity of solar concentrators which track the sun are disadvantages which have not been overcome previously. However, as will be demonstrated, the subject invention has a capacity to concentrate incident radiant electromagnetic energy by an order of magnitude higher than the above disclosed devices, without tracking the daily motion of the sun, thus far exceeding any efficiency factor achieved by the prior art, and enabling high temperatures to be attained.

SUMMARY OF THE INVENTION

It has been found, in accordance with the present invention, that an efficient apparatus can be constructed for collecting and concentrating solar energy, without need for diurnal tracking. The apparatus includes a housing assembly, defining a generally rectangular mounting surface. A concentrator element, of hemispherical shape, and having a concave reflecting surface, is rigidly supported within the housing, with the concave surface facing upwardly, so as to receive and reflect solar radiation. Slidably supported upon the housing assembly, and positioned over the concentrator, is an arcuate fluid-bearing heat collector element. The concentrator element reflects incident solar radiation toward an arcuate focal zone corresponding to the shape of, and extending in a curved path over the collector; the focal zone of energy concentration at any instant depending on the position of the sun. Since the heat collector element is positioned by the sliding adjustment at the focal zone of solar radiation reflected from the concentrator surface, it accepts and absorbs substantially all the reflected solar rays with only a seasonal adjustment required.

Accordingly, it is a principal object of the subject invention to provide an extremely efficient apparatus for absorbing the broad spectrum of electromagnetic radiation generated by the sun.

It is another object of the subject invention to provide a solar energy collector and concentrator capable of operating efficiently in a stationary mount, thereby eliminating the need for diurnal tracking mechanisms.

It is a further object of the invention to provide a non-tracking solar energy concentrator and collector having a hemi-sperical reflector and a curved fluid-bearing conduit, adjusted in combination for concentrating radiant electromagnetic energy from the sun upon a corresponding focal path which traverses the collector.

It is a still further object of the invention to provide an improved solar collection system which may be manually or automatically adjusted to optimize solar collection as a function of season.

Other objects and a fuller understanding of the invention may be had by referring to the following description and claims, taken in conjunction with accompanying drawings.

BRIEF DESCRIPTION OF THE DRAWINGS

FIG. 8 is a top plan view of the device of FIG. 7.

FIG. 9 is a sectional view of the invention through line 9—9 of FIG. 8.

FIG. 10 is a cutaway end view of the invention of FIG. 8.

DESCRIPTION OF THE INVENTION

In the apparatus proposed herein use is made of the optical properties of a hemisphere having a reflecting coating on the concave surface. In what follows the term focus will not refer to a one-to-one object-point image-point relationship as in image forming optics theory, but is defined as an area or focal zone of high energy concentration. The term optical axis is herein defined as a line of symmetry formed by that ray of the sun that passes through the geometric center of the hemisphere at a given moment. Therefore, as the sun moves across the sky, the optical axis rotates about the geometric center of the hemisphere.

Figure 1:
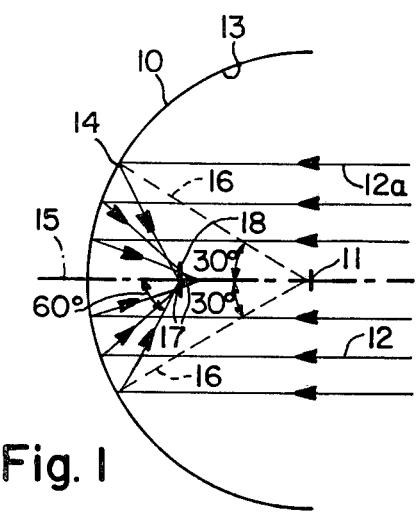
FIG. 1 is a section through the reflector of the subject invention, showing a ray trace pattern.

Referring now to FIG. 1, a section is shown through the hemispherical reflector 10 of the subject invention, in which a ray trace pattern depicting the plane determined by the incident rays of the sun as it travels through the sky and the geometric center 11 of the hemisphere is diagrammed. An incident ray 12a striking the concave reflector surface 13 is reflected at point 14 whereby it intercepts the optical axis 15. Consider the beam of energy striking the hemisphere within the cone defined by the locus of normals 16 making an angle of 30° with the optical axis as shown. Since the sun subtends an angle of about one-half degree at the earth's surface, and considering non-image forming optics, rays from the sun can be considered as essentially parallel. The rays 12 parallel to the optical axis 15 strike the mirror surface inside the cone defined above, undergoing reflection and thereby meeting the optical axis at a common focal zone 17. Note that all the energy in the entering beam could be intercepted by a circular plane collector 18 placed orthogonal to the optical axis at the focal zone 17. While it is assumed for purposes of illustration that the collecting surface is a plane perpendicular to the optical axis, this need not be the case.

Note that the outer rays of the beam defined above would strike the collector surface with an angle of incidence of 60°. It is observed that angles of incidence greater than 60° would be inefficient, hence the 30° parameter for the purposes of this discussion. Further, from symmetry considerations it can be seen that the ray trace pattern is valid for any plane intersecting the optical axis formed by the ray of the sun passing through the geometric center of the hemisphere at any instant of time.

Figure 2:
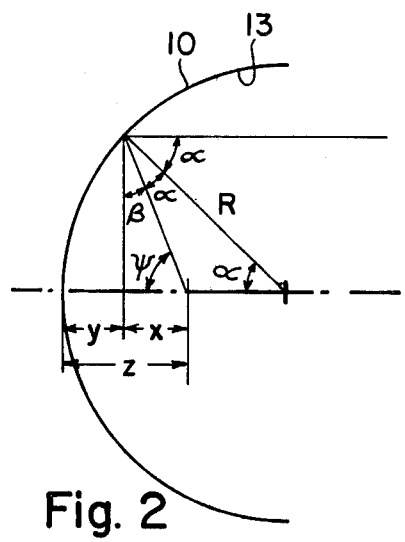
FIG. 2 is another form of ray trace pattern, showing geometric relationships for computing the concentration factor.

To obtain an approximation of the gain in concentration of solar rays provided by the invention, a geometric construction developing FIG. 1 in more detail may be used. Referring now to FIG. 2, $$\psi = 2\alpha \quad (1)$$

$$\beta = 90° - \alpha \quad (2)$$

$$x = R \sin\alpha \tan\beta \quad (3)$$

$$y = R(1 - \cos\alpha) \quad (4)$$

$$z = x + y \quad (5)$$

$$x_r = x/R \quad (6)$$

$$y_r = y/R \quad (7)$$

$$z_r = x_r + y_r \quad (8)$$

Figure 3:
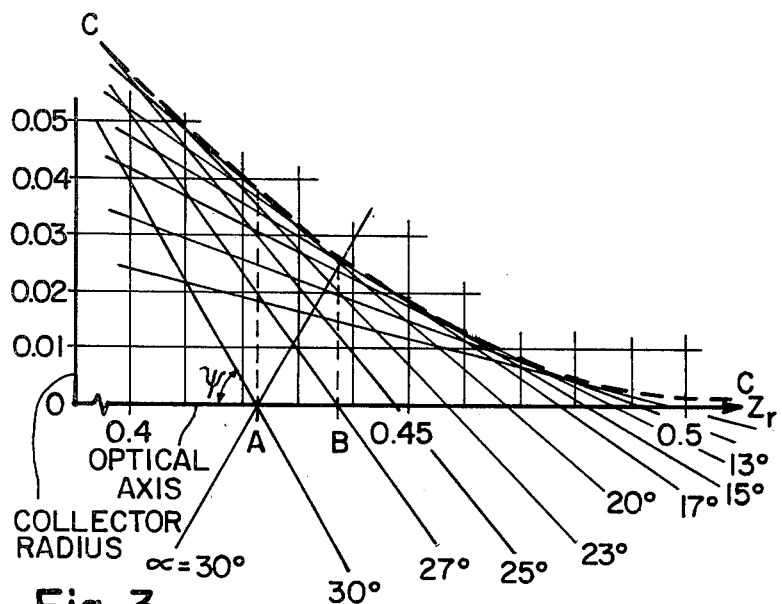
FIG. 3 is a geometric construction, adapted from FIG. 2, for scaling concentration factors from the drawing.

These equations may be used to determine the distance z from the hemispherical surface to the point where a ray with a given angle $\alpha$ crosses the optical axis and the angle $\psi$ it makes with the optical axis. The resultant calculations are plotted in FIG. 3 for values of $\alpha$, $z_r$, and $\psi$. Note that these values are normalized to the concentrator radius R. From this graphical construction collector radii were measured at position A, where the ray $\alpha = 30°$ crosses the optical axis and position B, which is the optimal position, where the radius of a collector would just intercept the 30° ray. Defining the gain in concentration as the square of the radius of the entering beam $R_e$, divided by the square of the radius of the collector $R_c$, the concentration factor may calculated. At position A there is found a gain of 178, and at position B there is found a gain of 360 in concentration, placing the efficiency of a spherical reflector used in this manner as an energy collector between a focusing paraboloid with a concentration factor of 1000, and the device of Winston, supra, with a concentration factor of 10.

The intensity of radiant solar energy that reaches the earth's surface varies between 1.5 and 0 cal cm$^{-2}$ min$^{-1}$. Where the average intensity of radiation is 1.0 cal cm$^{-2}$ min$^{-1}$ the quantity of energy received would be 65 watt ft$^{-2}$. The Stefan-Boltzman law shows that the total radiant flux W from an area S of a black body varies with the temperature:

$$W = \delta S T^4,$$

where $\delta$ is $5.34 \times 10^{-9}$ watt ft$^{-2}$ deg$^{-4}$. T is the temperature on the Kelvin scale. Using the above value of 65 watt ft$^{-2}$ for W gives a black body temperature of 59° C. or 138° F.

Computing on this basis for positions A and B of the collector, theoretical temperatures of 1724° F. and 2,145° F., respectively, are obtained. These estimates are only approximations, and may vary considerably with the actual device.

For optimal efficiency in year around energy collection, the reflector must be placed at an angle with respect to the horizon that takes into consideration the apparent seasonal variation in position of the sun. The reflector should be mounted so that the plane defined by the front circular edge of the mirror at the site is parallel to a plane tangent to the earth at the equator at the same longitude as the site.

To understand the operation of the system, consider the movement of the sun across the heavens in the celestial sphere. The great-circle distance of a point on the celestial sphere from the celestial equator is called the declination of the point. This corresponds to the latitude of a point on the earth. Thus a line from the center of the earth to the sun at a given declination would pass through the commensurate latitude of the earth. During one day's rotation of the earth the line would describe a cone with its apex at the center of the earth and its surface passing through the latitude circle on the surface of the earth. A similar situation would obtain for the reflector mounted as described above with a line from the sun passing through the center of the reflector tracing the conjugate latitude circle on the mirror surface. (The center of the reflector is that point that would be the center of the sphere if the reflector were a sphere rather than a hemisphere.)

It is of interest to note that the declination of the sun changes only by 2.82° during the first week after equinox and by 0.1676° during the first week after solstice. Thus, depending on the type of embodiment of the device, adjustment of the system to compensate for the apparent seasonal motion of the sun would be required perhaps once or twice weekly at the time of the equinoxes and much less frequently for the period around the solstices.

Figure 4:
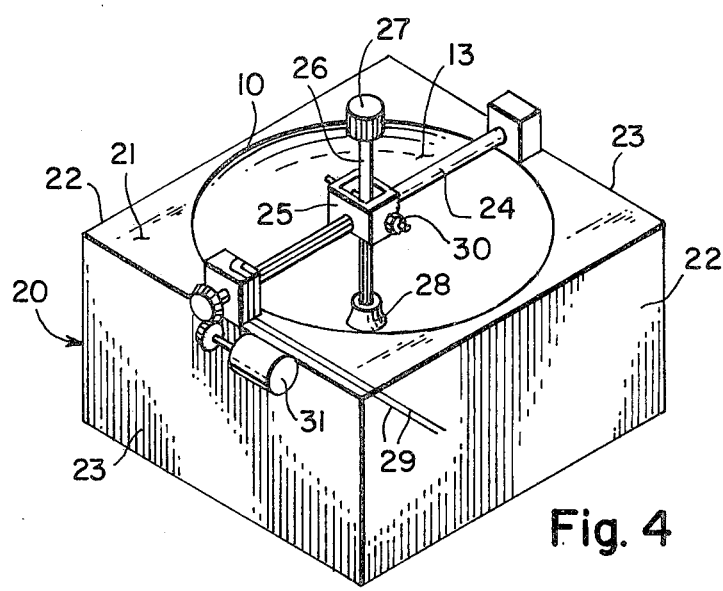
FIG. 4 is a perspective view of one embodiment of the invention.

One embodiment of the means for adjusting the invention for seasonal tracking would be to place an equatorial class astronomical mount at the center of the hemisphere with an energy collector element at the end of a boom. During the day the collector would be rotated around a north-south axis of the reflector and follow the local focal zone as the sun moved across the sky. Although it may be used for concentrating energy from other sources of electromagnetic energy as well, if used for solar energy collection a latitude correction would have to be made seasonably, as well as provide a heat transfer medium for use other than research. Referring now to FIG. 4, there is shown a perspective view of this embodiment of the invention. A housing assembly 20 defining a generally rectangular mounting surface 21, and having end walls 22 and side walls 23, supports a concentrator element 10 in rigid relationship therein. The concentrator element has a concave reflector surface 13 with the concave surface facing upwardly towards the sun. An axial cross-member 24 having an aperture 25 at its midpoint and longitudinally positioned over the geometric center of the concentrator element is pivotally supported at opposing sidewalls 23 of the housing assembly. A boom 26 having a counterweight 27 at one end is pivotally supported at the aperture of the crossmember, the axis of the pivotal support being in a direction at right angles to the crossmember. A fluid-bearing heat collector element 28 is supported from the end of the boom opposing the counterweight. Flexible conduit 29 traverses the axial cross member and the boom, communicating with the fluid-bearing heat collector element, whereby heat absorbing fluid may be circulated therein to an external heat sink or storage unit. A clamp or locking device 30 is provided so that the boom may be locked at its pivot point at the optimum attitude of the collector element for seasonal acceptance of solar radiation. A motor or clock escapement 31 of conventional design may be used to rotate the crossmember about its axis in a relative East-West direction for positioning the collector element to track the apparent diurnal movement of the sun.

One application of the above embodiment is in astronomical spectroscopy, where a corrector lens and spectrograph would be mounted on the collector end of the boom. Of course, it is obvious in this application that the fluid bearing elements would not be required. Preferred position of the corrector lens would be in the range of approximately 0.3 to 0.4 radius distant from the reflector surface. The advantage of this device is that it greatly enhances the concentration of energy.

Figure 5:
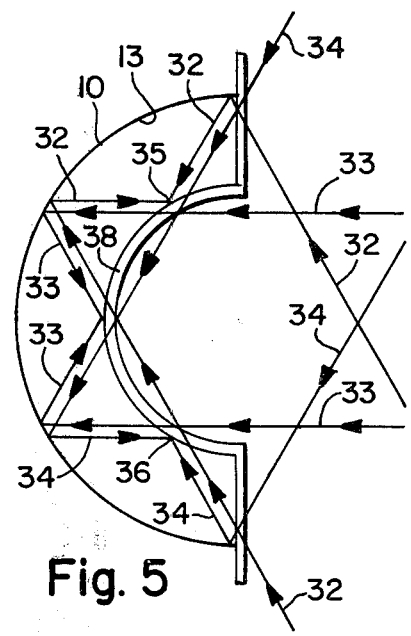
FIG. 5 is a section through the concentrator of the invention, showing reflection of incident rays upon an arcuate collector.

In the embodiment shown in FIG. 5, the collector is comprised of an arcuate tube or conduit so shaped and mounted that the focus of the combination with the reflector traverses the collector during the day as the sun moves through the sky in its apparent diurnal path. Thus, the tube herein is shaped in a semi-circle and oriented along a due East-West line so that the only tracking required is a seasonal adjustment. The width of the collector tube is approximately equal to the width of the focal zone of energy concentration. A fluid is circulated through the collector tube to carry the collected heat energy to a heat sink or heat storage unit. For greatest efficiency the collector element should be preferably flat on the side of the incoming reflected energy and have an absorbent coating thereon. This embodiment may also employ an array of photo-voltaic cells mounted on the arcuate collector so as to intercept the sun's rays, thereby permitting the development of electrical energy as well as thermal energy.

Referring again to FIG. 5, a sectional view is shown through the concentrator 10 of the invention, diagramming the reflection of incident solar rays from the hemisphere upon an arcuate collector 38. The diagram displays the way in which the focal zone traverses the curved reflector over an eight-hour period of sunlight. Collector element 38 is shown mounted in the focal zone of concentrator element 10. Morning solar rays, four hours before noon, are at 32, high noon rays at 33, and afternoon rays, four hours after high noon, at 34. The morning area of concentration of energy is at 35, and the afternoon concentration of energy at 36. During this period, there would be no vignetting; during a half-hour period before and after rays 32 and 34, respectively, i.e., morning and evening, vignetting would reduce the beam intensity by one half. At solstice vignetting would reduce beam intensity by approximately four percent at four hours before and four hours after high noon. The shadowing effect of the collector is ignored here, since it would be negligible.

Figure 6:
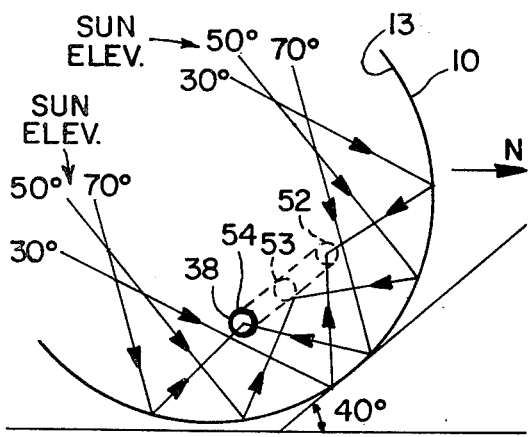
FIG. 6 is a section showing the change in collector position at solstice and equinox.

FIG. 6 shows a sectional view of the invention through a plane at right angles to the section of FIG. 5, illustrating the seasonal change in position of the collector element for both solstice and equinox, and the required inclination of the concentrator element, corresponding to the latitude at the site. Although maximum efficiency is obtained when the collector follows the curvature of the reflector as the position is seasonably changed, as an engineering decision in the interest of mechanical simplicity the example herein permits a simple linear sliding movement. Other more complex arrangements will permit more precise location of the collector. For a hemisphere 10 of 6-inch radius the collector element 38 would be about one-half inch in diameter. The change in position from winter solstice 52 or summer solstice 54 to equinox 53 would be about 1.4 in. The radius of the energy beam is 3 in., giving an effective area of 28 in$^2$. An intensity of radiation of 1 cal cm$^{-2}$ min$^{-1}$ yields 65 watts heat energy per sq. ft., or 0.45 watts/in.$^2$. Therefore, at 100 percent theoretical efficiency the system would produce 12.69 watts of heat energy with a 6-in. radius hemisphere. Because of the symmetry in the geometry of the invention, all the above dimensions would vary proportionately with the radius of the hemisphere.

Figure 7:
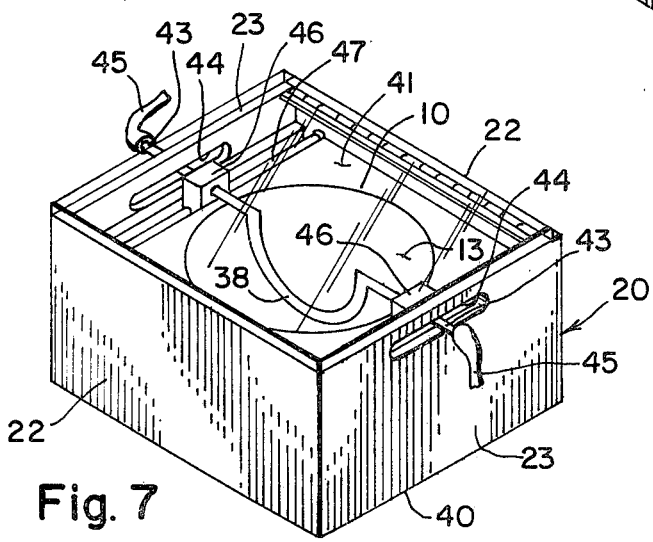
FIG. 7 is a perspective view of the preferred embodiment of the invention.

FIGS. 7, 8, 9, and 10 show the preferred embodiment of a non-imaging solar energy collection and concentration apparatus. Referring to FIG. 7, the invention comprises a housing assembly 20, a concentrator element 10, and a fluid-bearing heat collector element 38. The housing assembly defines a generally rectangular mounting surface, shown herein in the form of a simple box frame, further comprising a base 40, side walls 23, and end walls 22. This structure is not essential to the invention, and any construction giving suitable support to the members is acceptable. The housing is preferably equipped with a transparent protective cover 41 which may consist of one or more sections, can be hingedly mounted to side walls 23 or end walls 22 and can be sealed with conventional heat-resisting materials to said side walls and end walls. The transparent protective cover may consist of any break-resistant glass or plastic which has a relatively high transmissibility to the incident electromagnetic energy in the spectral region of interest, and may be suitably coated to reduce reflection.

As shown further in FIG. 9, the concentrator element 10 is of hemispherical shape, and has a concave surface 13 faced upwardly so as to engage the solar rays, thereby reflecting incident solar radiation toward an arcuate focal zone. The concentrator element may be formed of a structural shell which supports, sustains, and defines an inner specular lining, or with the reflecting surface as an integral part of the element.

The concentrator element can be made of metal, plastic, fiberglass, or even papier-mache, so long as it has sufficient strength to prevent deformation under its own weight or under the influence of thermal stresses. At no time should the concentrator surface rise to a temperature such that the use of the above materials would be impaired. Fabrication can be by any method appropriate to the material, such as machining, molding, casting, spinning, or extrusion. It is not required that the concentrator be formed from one solid block of material, and it may also be built up in segments for larger structures. In one embodiment, the hemispherical surface is formed by an overlay of flat, tesselated mirrors, where the individual mirrors are kept small in size in comparison to the reflected focal zone. With this construction, good alignment of the individual mirror members is critical. Furthermore, much larger mirrors could be used in such a tesselated structure, provided the individual elements are suitably curved, and installed with precision in alignment of the individual elements with the composite structure.

The reflecting surface 13 must be specular in the spectral region of interest. It may be fabricated by electroplating, vacuum depositing, gilding, chemical depositing, machining and polishing, or any similar process adaptable to the nature of the size, material, and specific structure of the concentrator element.

It may also be seen from FIG. 7 that the concentrator element is rigidly supported within the housing assembly, since movement of the reflector surface is not essential to this invention.

Figure 12:
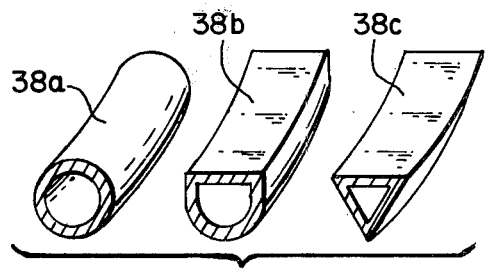
FIG. 12 shows suitable cross-sections of the collector element.

The fluid-bearing heat collector element 38 is positioned to accept and absorb the reflected solar rays concentrated at the focal zone of solar radiation received from the reflecting surface of the concentrator element. The collector element is slidably supported upon the housing assembly, positioned over the reflecting surface of the concentrator element, with adjustment means for seasonally varying the lateral displacement with respect to the center of the concentrator element. The collector element takes the form of a tube or conduit, shaped in a semi-circle conforming to a constant focal distance from the concave reflecting surface of the concentrator. This geometric configuration of the fluid-bearing heat collector element allows absorption of the arriving solar radiation for all elevations of the sun during the day, without movement of the collector element, as the focal zone of solar rays reflected from the concentrator element traverses the arc of the fluid-bearing heat collector element in response to the travel of the sun across the sky. The collector tube may be of circular or wedge-shaped cross-section, or faced with a flat on the side facing the concentrator element, all as shown in FIG. 12. The collector tube may further be coated with a heat absorbing medium on the side facing the reflector, so as to improve the heat transfer efficiency.

The collector tube is preferably made of copper, although other metals such as aluminum and light-transparent plastic are also suitable. Glass may also be used.

As shown in FIGS. 8, 9 and 10, the collector tube ends 43 are slidably received by elongated openings 44 in the sidewalls of the housing assembly. Flexible coupling means or flexible tubing 45 is provided to conduct fluid to and from the tube ends 43. Consequently, the collector tube ends are freely carried within the elongated openings of the housing assembly, and the collector tube is free to slide along the housing and traverse the reflector face when urged by adjustment means, as would be provided to obtain maximum collector efficiency at any position of the sun, seasonally.

In the embodiment shown in FIG. 8, the collector tube ends are fixedly received by a coupling block 46, which also serves to communicate with the aforementioned flexible tubing means, and as a carrier for the collector adjustment means. Two guide bars 47 are provided, their lengths parallel to each other and to the housing assembly side walls, supported from the end walls. The coupling blocks are longitudinally slidable along the guide bars within the housing along opposite side walls. The guide bars may be calibrated for seasonal adjustment and the collector tube manually adjusted, being clamped in position by means not shown, but well known to those skilled in the art.

Figure 11:
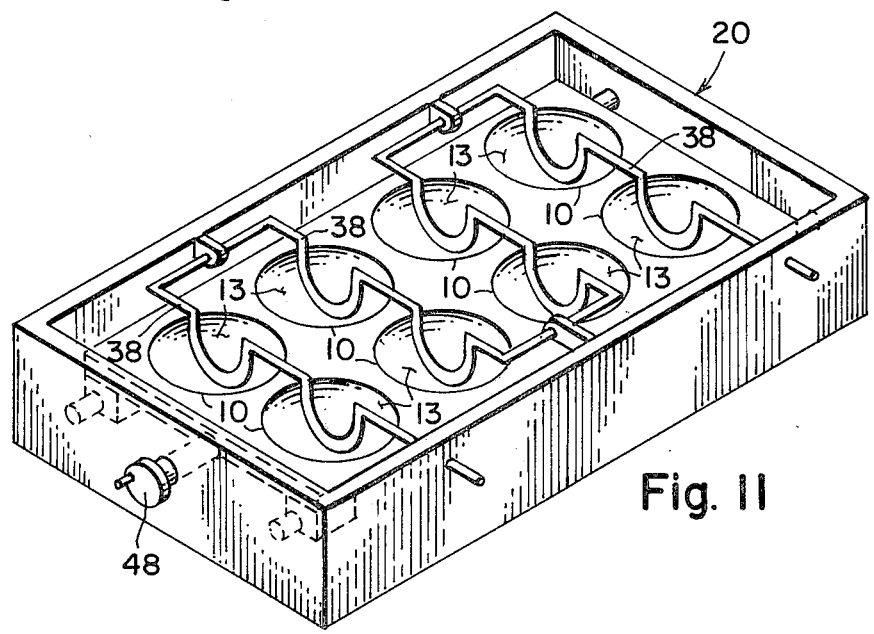
FIG. 11 is a perspective view of another embodiment having multiple concentrator elements.

FIG. 11 shows another application of the invention, in which a multiplicity of solar collectors and concentrators are employed. A housing assembly 20 of generally rectangular shape defining a rectangular mounting surface supports a multiplicity of concentrator elements 10 of hemispherical shape, slidably supported within the housing assembly, the concentrator elements each having a concave reflecting surface 13 with the concave surface facing upwardly towards the sun. The example shown herein is a parallel array of 8 elements, arranged in a 2 × 4 matrix, which can be stamped or molded in one piece.

A multiplicity of arcuate fluid-bearing heat collector elements 38 are rigidly supported upon the housing assembly and over the reflecting surfaces of their associated concentrator elements. The collector elements are here shown in a series connection, although parallel and series-parallel arrangements may also be used. As the concentrator elements are adapted to reflect incident solar radiation toward an arcuate focal zone, and each of the associated heat collector elements is positioned respectively at the focal zone of solar radiation reflected from its associated concentrator surface, the energy from the reflected solar rays is accepted and absorbed as the focal point traverses the arcuate collector.

An adjustment for positioning the plurality of concentrator elements in synchronism to seasonably track the movement of the sun and hence optimize the collection of solar energy, regardless of the position of the sun during the day, can easily be provided by a calibrated drive screw 48, adapted by conventional means to move the concentrator array in a North-South direction. Other means for driving the array, as described in the embodiments herein, are also suitable.

It is to be understood that the terms solar radiation and electromagnetic radiation have been used interchangably to refer to the energy or radiation emitted by the sun; however the apparatus disclosed in accordance with this invention may also be used to collect and concentrate energy emitted from other bodies as well.

While a preferred embodiment has been set forth in the description and drawings, it will be understood by those skilled in the art that design and structural details may be varied without departing from the true spirit and scope of this invention as defined by the appended claims.

What is claimed is:

1. A non-imaging solar energy collection and concentration apparatus, comprising:
   a. a housing assembly defining a generally rectangular mounting surface;
   b. a concentrator element of hemispherical shape, supported within the housing assembly in rigid relationship thereto, having a concave reflecting surface, with the concave surface faced upwardly;
   c. an arcuate fluid-bearing heat collector element, slidably supported upon the housing assembly and over the reflecting surface of the concentrator element;
   d. said concentrator element being adapted to reflect incident solar radiation toward an arcuate focal zone; and
   e. said fluid-bearing heat collector element being positioned at the focal zone of solar radiation reflected from the concentrator surface, and operable to accept and absorb the reflected solar rays;
   f. said arcuate fluid bearing heat collector element being further disposed within said hemispherical concentrator element, and being substantially parallel with respect to the arcuate portion of the hemispherical-shaped concentrator element.

2. Apparatus as set forth in claim 1, wherein the housing assembly comprises a box frame.

3. Apparatus as set forth in claim 1, wherein the collector element is mounted on adjustable means for positioning said collector to track the movement of the sun and hence optimize the collection of solar energy regardless of the position of the sun.

4. Apparatus as set forth in claim 3, wherein the adjustable means includes means mounting said collector for seasonal tracking of apparent solar motion.

5. Apparatus as set forth in claim 4, wherein the means for seasonal tracking for apparent solar motion comprises means mounting for movement exclusively in a relative North-South direction.

6. The structure as set forth in claim 1, wherein the heat collector element comprises metal tubing.

7. The structure as set forth in claim 1, wherein the heat collector element comprises a light-transparent tubing.

8. The structure as set forth in claim 1, wherein the heat collector element has a flat surface facing the concentrator.

9. The structure as set forth in claim 1, wherein the reflector surface of said concentrator element is comprised of a plurality of tesselated flat mirrors.

10. Apparatus as set forth in claim 1, further comprising transparent protective cover means overlaying said concentrator.

11. Apparatus as set forth in claim 1, wherein the focal point of solar rays reflected from the concentrator element traverses the fluid-bearing heat collector element in response to the travel of the sun across the sky.

12. Apparatus as set forth in claim 1, wherein said collector element has a heat absorbing coating.

13. A non-imaging solar energy collection and concentration apparatus, comprising:
   a. a housing assembly defining a generally rectangular mounting surface;
   b. a multiplicity of concentrator elements of hemispherical shape, slidably supported within the housing assembly, the concentrator elements each having a concave reflecting surface, with the concave surfaces facing upwardly;
   c. a multiplicity of arcuate fluid-bearing heat collector elements rigidly supported upon the housing assembly and over the reflecting surfaces of their associated concentrator elements;
   d. each of the concentrator elements being adapted to reflect incident solar radiation toward an arcuate focal zone; and
   e. each of said fluid-bearing heat collector elements being positioned respectively at the focal zone of solar radiation reflected from its associated concentrator surface, whereby the energy from the reflected solar rays is accepted and absorbed as the focal point traverses the arcuate collector;
   f. adjustment means, whereby the plurality of concentrator elements may be positioned in synchronism to track the movement of the sun and hence optimize the collection of solar energy, regardless of the position of the sun during the day;
   g. each of said arcuate fluid bearing heat collector elements being further disposed within its respective hemispherical concentrator element, and being substantially parallel with respect to the arcuate portion of said concentrator element.

14. The structure of claim 13, wherein said adjustment means comprises means for seasonal tracking movement exclusively in a relative North-South direction.

15. A non-imaging apparatus for collection and concentration of electromagnetic energy, comprising:
 a. a housing assembly,
 b. at least one concentrator element of hemispherical shape, having a concave reflecting surface, with the concave surface faced upwardly,
 c. means for supporting and positioning the concentrator element in relation to the housing,
 d. at least one arcuate electromagnetic energy collector element,
 e. means for supporting and positioning the collector element with respect to the concentrator element,
 f. said concentrator element being adapted to reflect incident electromagnetic radiation towards an arcuate focal zone, and
 g. said collector element being positioned at the focal zone of radiation reflected from the concentrator surface, and operable to accept and absorb the reflected electromagnetic rays,
 h. said arcuate energy collector element being further disposed within said hemispherical concentrator element, and being substantially parallel with respect to the arcuate portion of the hemispherical-shaped concentrator element.

* * * * *